(12) United States Patent
Suzuki et al.

(10) Patent No.: US 10,262,445 B2
(45) Date of Patent: Apr. 16, 2019

(54) MOBILE TERMINAL DEVICE, MANAGEMENT DEVICE, STORAGE MEDIUM FOR DISPLAYING CAPTURED IMAGES

(71) Applicant: JVC KENWOOD Corporation, Yokohama-shi, Kanagawa (JP)

(72) Inventors: Fuminori Suzuki, Yokohama (JP); Ichiro Shishido, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 15/427,446

(22) Filed: Feb. 8, 2017

(65) Prior Publication Data

US 2017/0228906 A1 Aug. 10, 2017

(30) Foreign Application Priority Data

Feb. 9, 2016 (JP) ................................. 2016-022334

(51) Int. Cl.
  *G06T 11/60* (2006.01)
  *G01C 21/20* (2006.01)
  *H04W 88/06* (2009.01)
  *H04W 24/04* (2009.01)

(52) U.S. Cl.
  CPC .............. *G06T 11/60* (2013.01); *G01C 21/20* (2013.01); *H04W 24/04* (2013.01); *H04W 88/06* (2013.01)

(58) Field of Classification Search
  CPC ... G06T 11/00; G06T 19/006; G06F 3/04886; G06F 17/30; G06F 17/30041; H04W 88/00; H04W 24/04; G01C 21/20

USPC .......................................................... 345/633
See application file for complete search history.

(56) References Cited

U.S. PATENT DOCUMENTS

| 9,338,627 | B1* | 5/2016 | Singh ..................... G06F 3/0416 |
| 2006/0088162 | A1* | 4/2006 | LeComte ............. H04N 7/1675 380/210 |
| 2011/0037712 | A1* | 2/2011 | Kim ..................... H04M 1/7253 345/173 |
| 2011/0045846 | A1* | 2/2011 | Rekimoto ............. G01S 5/0018 455/456.1 |
| 2011/0189972 | A1* | 8/2011 | Sato ..................... H04W 74/008 455/404.1 |
| 2012/0036461 | A1* | 2/2012 | Parkulo ................. G01S 13/878 715/769 |
| 2012/0040636 | A1* | 2/2012 | Kazmi ..................... H04W 4/90 455/404.2 |
| 2012/0147040 | A1* | 6/2012 | Yun ........................ G06T 19/006 345/633 |
| 2012/0207023 | A1* | 8/2012 | Tsuda ..................... H04W 48/06 370/235 |

(Continued)

FOREIGN PATENT DOCUMENTS

JP 2012-221330 A 11/2012

*Primary Examiner* — Sae Won Yoon
(74) *Attorney, Agent, or Firm* — Brundidge & Stanger, P.C.

(57) ABSTRACT

An imaging unit captures an image. A communication unit communicates with a base station device and acquires ease information related to ease of communication with at least one base station device and associated with positional information. A display unit displays an image captured by the imaging unit, and displays the ease information in the image, associating the positional information in the ease information with coordinates in the image.

9 Claims, 19 Drawing Sheets

(56) References Cited

U.S. PATENT DOCUMENTS

| | | | | |
|---|---|---|---|---|
| 2012/0213071 A1* | 8/2012 | Jokinen | ............. | H04W 28/0289 |
| | | | | 370/232 |
| 2012/0302218 A1* | 11/2012 | Tsuda | ................... | H04W 28/24 |
| | | | | 455/414.1 |
| 2013/0281088 A1* | 10/2013 | Yu | ....................... | H04W 36/22 |
| | | | | 455/434 |
| 2014/0055490 A1* | 2/2014 | Mule | ....................... | G06T 11/80 |
| | | | | 345/633 |
| 2014/0245235 A1* | 8/2014 | Yang | ................... | G06F 3/0481 |
| | | | | 715/863 |
| 2015/0065178 A1* | 3/2015 | Beauregard | ........... | G01S 5/0252 |
| | | | | 455/456.6 |
| 2015/0153572 A1* | 6/2015 | Miao | ................... | G02B 27/017 |
| | | | | 345/8 |
| 2015/0356949 A1* | 12/2015 | Kim | ....................... | H04W 4/21 |
| | | | | 345/173 |

\* cited by examiner

FIG. 3

| LATITUDE | LONGITUDE | SIGNAL INTENSITY |
|----------|-----------|------------------|
| A1 | B1 | C1 |
| A2 | B2 | C2 |
| A3 | B3 | C3 |
| AZ | BZ | CZ |

| GROUP | BASE STATION DEVICE | MOBILE TERMINAL DEVICE | LATITUDE/ LONGITUDE |
|---|---|---|---|
| FIRST GROUP | FIRST BASE STATION DEVICE | FIRST MOBILE TERMINAL DEVICE | K1 |
| | | SECOND MOBILE TERMINAL DEVICE | K2 |
| | | THIRD MOBILE TERMINAL DEVICE | K3 |
| | | FOURTH MOBILE TERMINAL DEVICE | K4 |
| | SECOND BASE STATION DEVICE | FIFTH MOBILE TERMINAL DEVICE | K5 |
| ⋮ | ⋮ | ⋮ | |

| No | ID | LATITUDE/ LONGITUDE | SIGNAL INTENSITY | DATE AND TIME | ... |
|---|---|---|---|---|---|
| 001 | D1 | E1 | F1 | G1 | ... |
| 002 | D2 | E2 | F2 | G2 | ... |
| 003 | D3 | E3 | F3 | G3 | ... |
| 004 | D4 | E4 | F4 | G4 | ... |
| 005 | D5 | E5 | F5 | G5 | ... |
| 006 | D6 | E6 | F6 | G6 | ... |
| 007 | D7 | E7 | F7 | G7 | ... |
| 008 | D8 | E8 | F8 | G8 | ... |
| 009 | D9 | E9 | F9 | G9 | ... |
| 010 | D10 | E10 | F10 | G10 | ... |

60

MOBILE TERMINAL DEVICE, MANAGEMENT DEVICE, STORAGE MEDIUM FOR DISPLAYING CAPTURED IMAGES

CROSS-REFERENCE TO RELATED APPLICATION

This application is based upon and claims the benefit of priority from the prior Japanese Patent Application No. 2016-022334, filed on Feb. 9, 2016, the entire contents of which are incorporated herein by reference.

BACKGROUND

1. Field

The present invention relates to display technologies and, more particularly, to a mobile terminal device, a management device, and a storage medium for displaying captured images.

2. Description of the Related Art

Augmented reality (AR) technology enables for superimposing various information on a captured image. For example, the positions of communication terminals located around a given communication terminal are displayed in a background image using the AR technology. Attributes of users using other communication terminals and information related to compatibility between users can also be displayed (e.g., patent document 1).

[patent document 1] Japanese Patent Application Laid-open No. 2012-221330

Information on users using other communication terminals is displayed in a background image. It is therefore revealed where in the neighborhood of the communication terminal other users are found and which users are located in an easy-to-understand manner. However, the related-art display technology does not display sufficient information related to whether communication between communication terminals is enabled or information on communication quality, i.e., information dependent on the environment around the communication terminal.

SUMMARY

To address the aforementioned issue, the mobile terminal device according to one embodiment comprises: an imaging unit; a communication unit that communicates with a base station device and acquires ease information related to the ease of communication with at least one base station device and associated with positional information; and a display unit that displays an image captured by the imaging unit, and displays the ease information in the image, mapping the positional information in the ease information to coordinates in the image.

Another embodiment relates to a management device. The device is adapted to manage a base station device capable of communicating with a mobile terminal device, and comprises: a storage unit that stores ease information related to ease of communication between the mobile terminal device and at least one base station device and associated with positional information; and a communication unit that transmits the ease information stored in the storage unit to the mobile terminal device via the base station device. The ease information is for displaying, in the mobile terminal device, information related to ease of communication in a captured image such that coordinates in the image are mapped to the positional information.

Optional combinations of the aforementioned constituting elements, and implementations of the embodiment in the form of methods, apparatuses, systems, recording mediums, and computer programs may also be practiced as additional modes of the present embodiment.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 3 shows a data structure of a database stored in the storage unit of FIG. 2;

FIG. 10 shows a data structure of a database stored in the storage unit according to Embodiment 3;

FIG. 12 shows a data structure of a database stored in the storage unit according to Embodiment 4;

DETAILED DESCRIPTION

Figure 1:
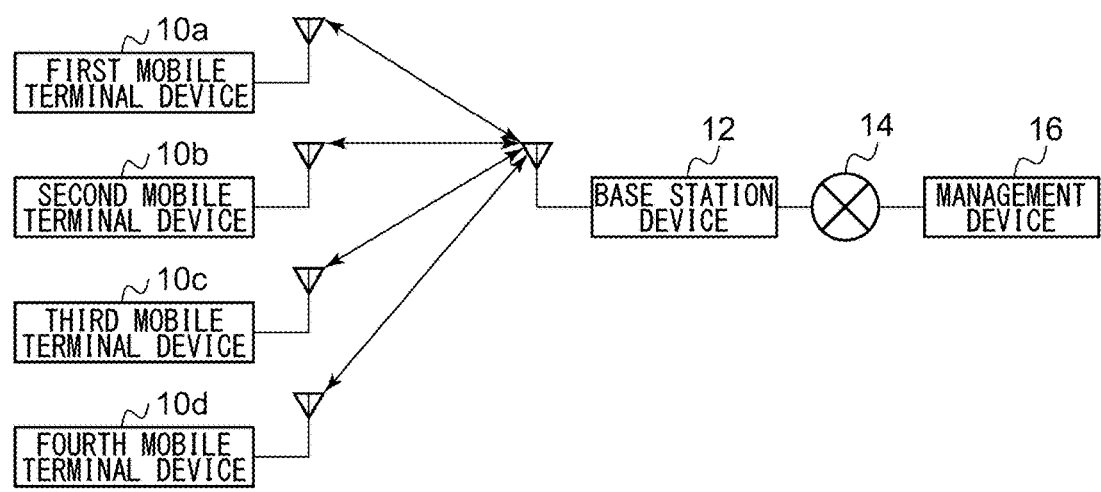
FIG. 1 shows a configuration of a communication system according to Embodiment 1.

The invention will now be described by reference to the preferred embodiments. This does not intend to limit the scope of the present invention, but to exemplify the invention.

Embodiment 1

A brief summary will be given before describing the invention in specific details. Embodiment 1 relates to a communication system including a plurality of mobile terminal devices configured to communicate with each other via a base station device. For example, the communication system is exemplified by a business wireless system. One-to-one mode of communication or one-to-many mode of communication may be used. The latter represents group communication. The mobile terminal device is provided with an imaging device and is capable of displaying augmented reality and acquiring Global Positioning System (GPS) information. The mobile terminal device may be configured as a single device or as a combination of two or more devices. For clarity of description, it will be assumed that the former is the case.

In the latter case, the mobile terminal device is implemented by, for example, a combination of a wireless device compatible with the business wireless system and a smartphone not compatible with the business wireless system. The wireless device and the smartphone can communicate with each other using a communication system different from the business wireless system so that the wireless device relays communication between the business wireless system and the smartphone. Further, the smartphone may be a device provided with an imaging device and capable of displaying augmented reality and acquiring Global Positioning System (GPS) information. Devices other than a smartphone may be used.

The managing device connected to the base station device stores prediction data or measurement data related to the signal intensity of a signal transmitted from the base station device and received by the mobile terminal device. The signal intensity is derived by simulated calculation and is derived for various positions with different latitudes and longitudes (hereinafter, sometimes referred to as "positional information"). The management device causes the signal intensity mapped to the latitude and longitude (hereinafter, referred to as "information on signal intensity") to be transmitted from the base station device. The mobile terminal device connected to the base station device receives the information on signal intensity. The mobile terminal device identifies the current position by the GPS function and generates an image by capturing an image of the environment around the mobile terminal device. The mobile terminal device uses the received information on signal intensity and identified current position and displays the signal intensity mapped to respective sets of coordinates in the image, superimposing the signal intensity on the captured image of the environment. In other words, the signal intensity at the respective spots is displayed in association with the background image. Therefore, by seeing the displayed image, the user of the mobile communication terminal can know how easy or difficult it is to communicate with the base station device in the environment displayed in the image.

FIG. 1 shows a configuration of a communication system 100 according to Embodiment 1. The communication system 100 includes a first mobile terminal device 10a, a second mobile terminal device 10b, a third mobile terminal device 10c, a fourth mobile terminal device 10d, which are generically referred to as mobile terminal devices 10, a base station device 12, a network 14, and a management device 16. The number of mobile terminal devices 10 included in the communication system 100 may not be limited to "4." A larger or smaller number of mobile terminal devices may be included. Also, the number of base station devices 12 included in the communication system 100 may not be limited to "1." A larger or smaller number of base station devices may be included. If a plurality of base station devices 12 are included, the management device 16 is connected to each of the plurality of base station devices 12 via the network 14.

As described above, the plurality of mobile terminal devices 10 and base station devices 12 are compatible with the business wireless system. Each mobile terminal device 10 performs speech communication and data communication via the base station device 12. The first mobile terminal device 10a transmits to the second mobile terminal device 10b via the base station device 12 in one-to-one mode of communication. Further, the first mobile terminal device 10a make a transmission to the second mobile terminal device 10b—fourth mobile terminal device 10d via the base station device 12 in one-to-many mode of communication.

The plurality of mobile terminal devices 10 communicate with each other via the base station device 12 and so should be located in an area in which it is possible to communicate with the base station device 12. However, even if the mobile terminal device 10 and the base station device 12 are located within a certain proximity, the quality of communication therebetween may not be favorable due to obstacles or geography. Meanwhile, the mobile terminal device 10 is carried by a user and so is movable. Therefore, the user using the first mobile terminal device 10a experiencing a poor quality of communication with the base station device 12 may, for example, move to a position where communication is improved. In order to implement this, it is desired that the status of the base station device 12 in the environment around the mobile terminal device 10 be presented to the user in an easy-to-understand manner. Such presentation is implemented by, for example, an application program run in the mobile terminal device 10.

Figure 2:
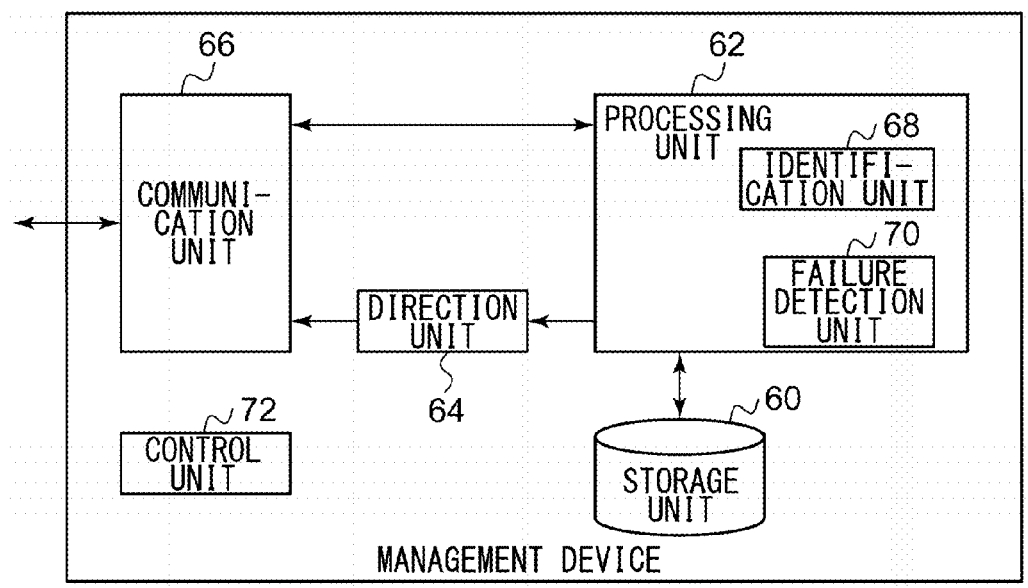
FIG. 2 shows a configuration of the management device of FIG. 1.

FIG. 2 shows a configuration of the management device 16. The management device 16 includes a storage unit 60, a processing unit 62, a direction unit 64, a communication unit 66, and a control unit 72. Further, the processing unit 62 includes an identification unit 68 and a failure detection unit 70. A description of the identification unit 68 is given later and so is omitted here.

The storage unit 60 stores various information used for processes. In particular, the storage unit 60 stores ease information related to the ease of communication from the mobile terminal device 10 to the base station device 12. The ease information represents information relating to a signal intensity of signals from the base station device 12 received by the mobile terminal device 10. The higher the signal intensity, the easier it is for the mobile terminal device 10 to communicate with the base station device 12. The lower the signal intensity, the more difficult it is for the mobile terminal device 10 to communicate with the base station device 12. For this reason, signal intensity serves as an indicator for determining whether it is easy to communicate with the base station device 12. The ease information, i.e., signal intensity, is formatted to have values mapped to various latitudes and longitudes and so can be said to be information associated with latitude and longitude.

FIG. 3 shows a data structure of a database stored in the storage unit 60. As shown in the figure, the signal intensity is listed in association with a combination of latitude and longitude. In other words, the positional information in respective spots and the signal intensity are mapped to each other and stored accordingly. The signal intensity is derived by simulated calculation such as ray tracing by allowing for the position where the base station device 12 is located, impacts from the geography and obstacles like buildings around the base station device 12. The signal intensity may be an experimental result (measurement data) previously determined. Alternatively, the signal intensity may be calculated by using measurement data for a limited number of spots, and performing a simulated calculation such as interpolation between measurement data for the other spots. Reference is made back to FIG. 2.

The processing unit 62 acquires information on signal intensity from the storage unit 60. Where the management device 16 is connected to a plurality of base station devices 12, the storage unit 60 stores information on signal intensity for each of the plurality of base station devices 12. Therefore, the processing unit 62 selects the information on signal intensity that should be output to the base station device 12 from a plurality of items of information on signal intensity. For example, to output the information on signal intensity to the first base station device 12*a*, the processing unit 62 selects the information on signal intensity for the first base station device 12*a*. The information on signal intensity for another base station device 12 may be selected, or the information on signal intensity for a plurality of base station devices 12 may be selected. The processing unit 62 outputs the selected information on signal intensity to the direction unit 64.

The direction unit 64 outputs the information on signal intensity input from the processing unit 62 to the base station device 12 via the communication unit 66 and the network 14. The base station device 12 transmits the input information on signal intensity to the mobile terminal device 10. It can therefore be said that the direction unit 64 causes the ease information stored in the storage unit 60 to be transmitted from the base station device 12 to the mobile terminal device 10. This allows the mobile terminal device 10 to display the ease information in a captured image, associating the latitude and longitude in the ease information with coordinates in the image. Details will be described later. In other words, an image in which each set of coordinate is associated with the signal intensity is displayed on the mobile terminal device 10.

The communication unit 66 is connected not only to the network 14 but also to one or more base station device 12 via the network 14. This configuration allows the communication unit 66 to communicate not only with the base station device 12 but also with the mobile terminal device 10 via the base station device 12. When a signal from the mobile terminal device 10 or the base station device 12 is received, the communication unit 66 outputs the information included in the signal to the processing unit 62.

The features are implemented in hardware such as a CPU, a memory, or other LSI's of a computer, and in software such as a program loaded into a memory, etc. The figure depicts functional blocks implemented by the cooperation of these elements. Therefore, it will be obvious to those skilled in the art that the functional blocks may be implemented in a variety of manners by hardware only, by software only, or by a combination of hardware and software.

Figure 4:
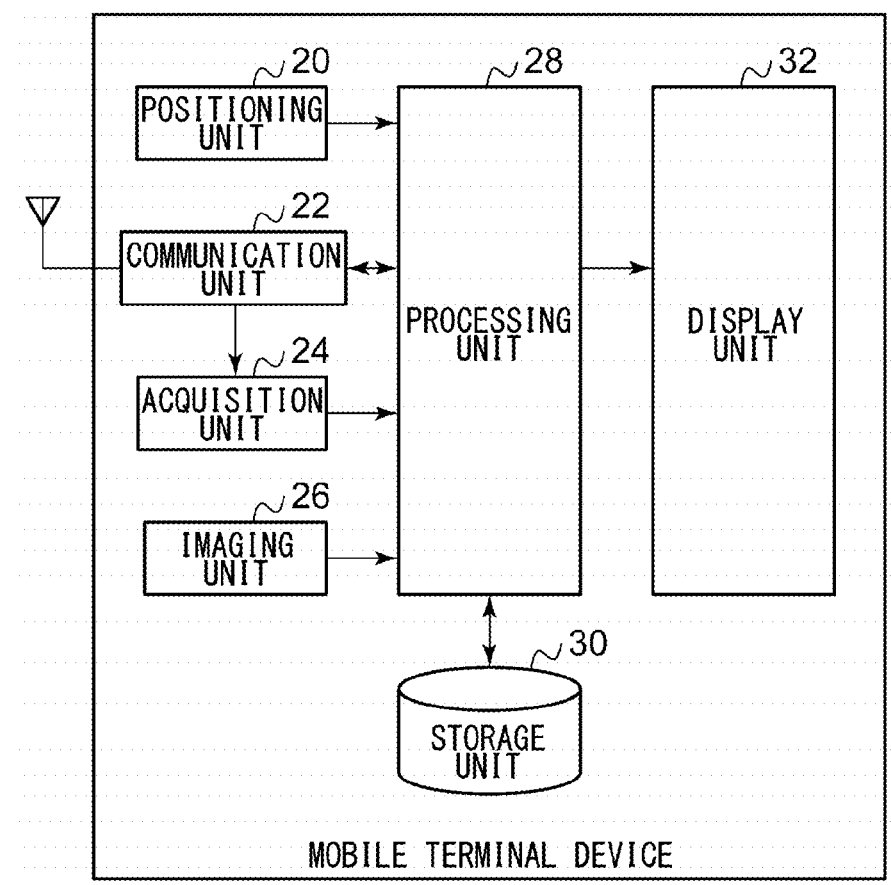
FIG. 4 shows a configuration of the mobile terminal device of FIG. 1.

FIG. 4 shows a configuration of the mobile terminal device 10. The mobile terminal device 10 includes a positioning unit 20, a communication unit 22, an acquisition unit 24, an imaging unit 26, a processing unit 28, a storage unit 30, and a display unit 32. The configuration is common to the first mobile terminal device 10*a* through the fourth mobile terminal device 10*d* of FIG. 1.

The positioning unit 20 identifies the position where the mobile terminal device 10 is located by receiving a signal from a GPS satellite (not shown). The position is indicated by, for example, latitude, longitude, and altitude. For GPS positioning, a publicly known technology may be used so that a description thereof is omitted. In addition to the position, the moving speed and moving direction may be detected. The positioning unit 20 is provided with a function of electronic compass and identifies the direction that the mobile terminal device 10 currently faces. The positioning unit 20 outputs these items of information (hereinafter, referred to as "first positional information") to the processing unit 28.

For example, the communication unit 22 is compatible with the business wireless system and communicates with another mobile terminal device 10 via the base station device 12. The communication unit 22 communicates with the management device 16 via the base station device 12. Therefore, the communication unit 22 receives a signal from the management device 16 by communicating with the base station device 12. The signal includes ease information (e.g., information on signal intensity of a signal received from the base station device 12). The communication unit 22 outputs the information on signal intensity to the acquisition unit 24. The acquisition unit 24 acquires the information on signal intensity from the communication unit 22. The acquisition unit 24 outputs the information on signal intensity to the processing unit 28.

The imaging unit 26 captures an image of the environment surrounding the mobile terminal device 10. The surrounding environment corresponds to the scenery around the mobile terminal device 10. It should be noted that the image may be a still image or moving images. The imaging unit 26 outputs the captured image to the processing unit 28. The output image may be digital data. The image as digital data is also referred to as "image."

The processing unit 28 receives the first positional information from the positioning unit 20, the information on signal intensity from the acquisition unit 24, and the image from the imaging unit 26. The processing unit 28 superimposes the information on signal intensity from the base station device 12 on an augmented space in the image by using AR technology. To describe it more specifically, the processing unit 28 maps coordinates in the image from the imaging unit 26 to the latitude and longitude, by referring to the current position in the first positional information and the information on the direction.

By assigning an arbitrary point in the image to certain fixed latitude and longitude in the image, the latitude and longitude at another point are uniquely derived, if the angle of view of the image is known. For example, given that the coordinates of a first point in the image are (x1, y1), and the coordinates of a second point different from the first point are (x2, y2), the latitude and longitude of the second point are determined if the latitude and longitude of the first point are determined. The processing unit 28 derives the latitude and longitude of the second point by mapping the current position in the first positional information to the first point, and maps coordinates in the image to the latitude/longitude by performing a similar process for different sets of coordinates in the image.

The processing unit 28 further converts the latitude and longitude in the information on signal intensity from the acquisition unit 24 into coordinates in the image, by using the correspondence between the coordinates in the image and the latitude/longitude. The process converts the information on signal intensity to the signal intensity corresponding to respective sets of coordinates in the image. The processing unit 28 uses the result of conversion to generate an image in which the signal intensity (magnitude of signal) is shown for each set of coordinates. In other words, the processing unit 28 displays the ease information in the image, associating the latitude and longitude in the ease information to the respective sets of coordinates in the image captured by the imaging unit 26.

Figure 5:
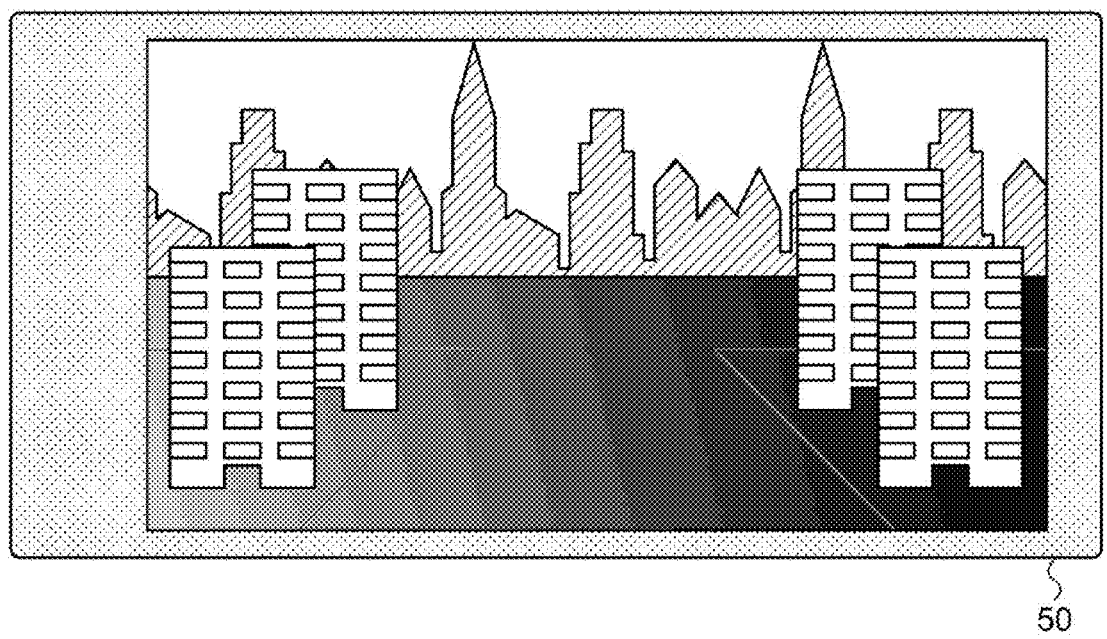
FIG. 5 shows an image generated by the processing unit of FIG. 4.

FIG. 5 shows an image 50 generated by the processing unit 28. In the image 50, the scenery around the mobile terminal device 10 is shown and the signal intensity associated with the respective sets of coordinates is shown. The signal intensity is indicated by a pattern of transparent color (color shades of a transparent color) superimposed in the image 50. For example, the higher the signal intensity, the darker the transparent color, and, the lower the signal intensity, the paler the transparent color. The relationship may be reversed. In FIG. 5, the higher the signal intensity, the darker the transparent color. The signal intensity is higher toward right in the figure than toward left. In other words, the processing unit 28 generates the image 50 in which each set of coordinates is associated with the signal intensity. In this process, the processing unit 28 changes the state of display in accordance with the value indicated by the information on signal intensity.

Figure 6:
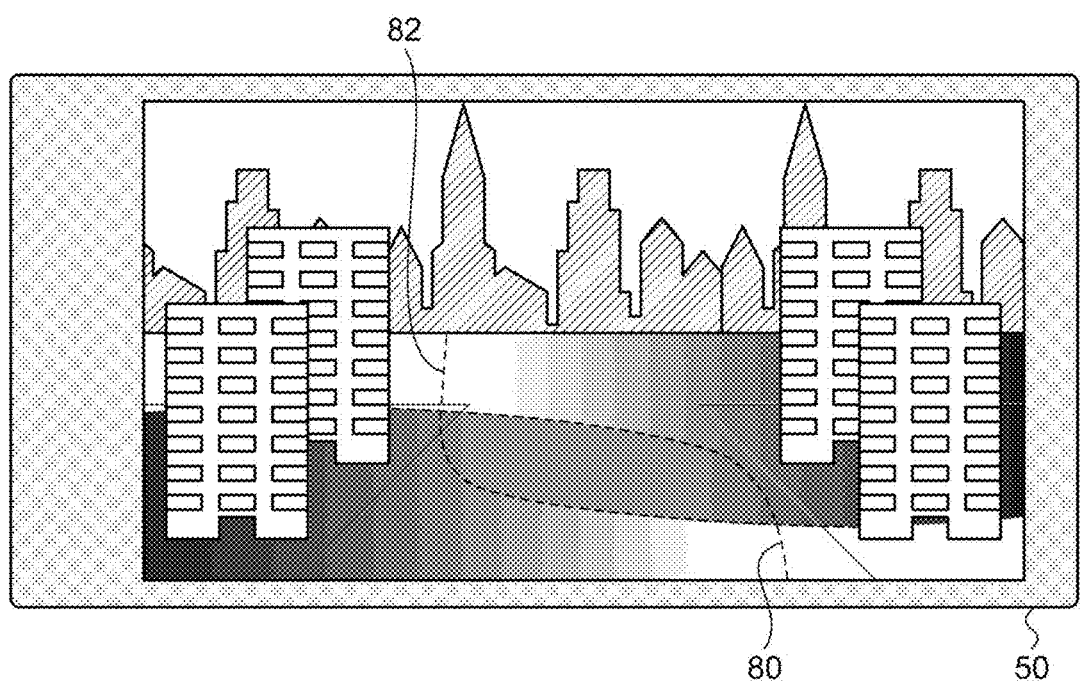
FIG. 6 shows an alternative image generated by the processing unit of FIG. 4.

FIG. 6 shows an alternative image 50 generated by the processing unit 28. The figure shows an exemplary image 50 generated when the communication unit 22 receives signals from a plurality of (e.g., two) base station devices 12 and the acquisition unit 24 acquires the information on signal intensity for the respective base station devices 12. The image 50 is shown in a manner similar to FIG. 5. The signal intensity corresponding to the two base station devices 12 is indicated by patterns of transparent colors of different color groups. In FIG. 6, as well as in FIG. 5, the signal intensity is reflected in color shades of the transparent color. In other words, the processing unit 28 shows the information on signal intensity for each of the plurality of base station devices 12 in the image 50.

To describe it in further detail, the image 50 shows an area in which signals from the first base station device 12a (not shown) can be received as a first area 80. The signal intensity from the first base station device 12a in the first area 80 is indicated by a color shade pattern of a certain color group. An area in which signals from the second base station device 12b (not shown) is shown as a second area 82. The signal intensity from the second base station device 12b in the second area 82 is indicated by a color shade pattern of a different color group. Further, an area where the first area 80 and the second area 82 overlap is indicated by a mixture of the colors. This makes it easy for the user of the mobile terminal device 10 to understand. The user can move to a place of good communication condition by referring to the image 50 shown on the display unit 32 described later. As a result, the user can check the communication condition on the user's own initiative without requiring a direction from an operator.

Figure 7:
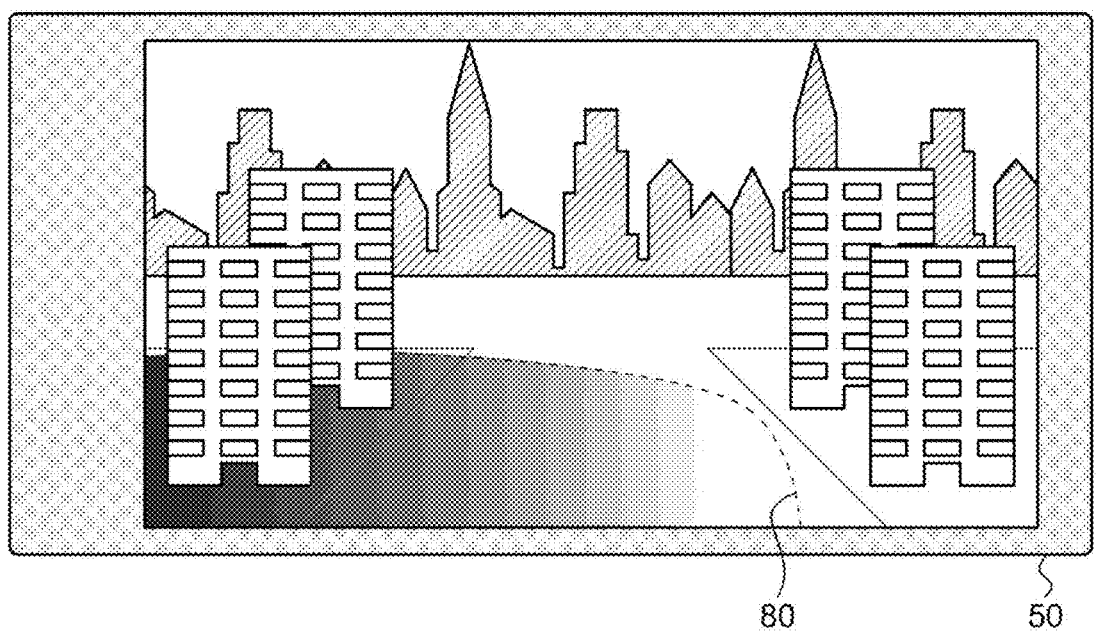
FIG. 7 shows a still alternative image generated by the processing unit of FIG. 4.

FIG. 7 shows a still alternative image generated by the processing unit 28. This figure shows the image 50 generated when one of the two base station devices 12 (the second base station device 12b) in FIG. 6 is not available. That the base station device is unavailable means that all of the channels of the base station device 12 are used or a failure occurs in the base station device 12. The failure detection unit 70 of the management device 16 determines whether a failure occurs in each base station device 12 and causes the base station device 12 with a failure not to transmit ease information to the mobile terminal device 10. More specifically, the direction unit 64 does not output ease information to the communication unit 66. Alternatively, the control unit 72 may control the communication unit 66 not to transmit ease information. Still alternatively, the control unit 72 may append information indicating a failure (hereinafter, referred to as "failure information") before causing the communication unit 66 to transmit the ease information. As shown in the figure, the signal intensity corresponding to the available base station device 12 (the first base station device 12a) is indicated. Meanwhile, the signal intensity corresponding to the unavailable base station device 12 (the second base station device 12b) is not indicated. When the image 50 like this is displayed on the display unit 32 described later, the user can easily move to an area in which communication is enabled and achieve an objective of communicating. Because the mobile terminal device 10 can be moved smoothly from the area of the base station device 12 with a failure, undesired confusion is avoided and the operation efficiency of the system as a whole can be improved. In the event that the mobile terminal device 10 receives ease information to which information indicating a failure is appended, the area covered by the base station device 12 with a failure may be displayed in a state that can be distinguished from a normal state. For example, the area may be indicated by a pattern different from a color shade pattern indicating the signal intensity or by a different color (e.g., gray). Alternatively, the outer circumference of the covered area may be indicated by a dotted line. Reference is made back to FIG. 4.

The storage unit 30 stores various information used for processes. For example, the storage unit 30 stores the first positional information from the positioning unit 20, the information on signal intensity from the acquisition unit 24, and image from the imaging unit 26. The display unit 32 displays the image 50 generated by the processing unit 28. For example, the image 50 shown in FIG. 5 and FIG. 6 is shown. The display unit 32 may be implemented by a touch-sensitive panel.

Figure 8:
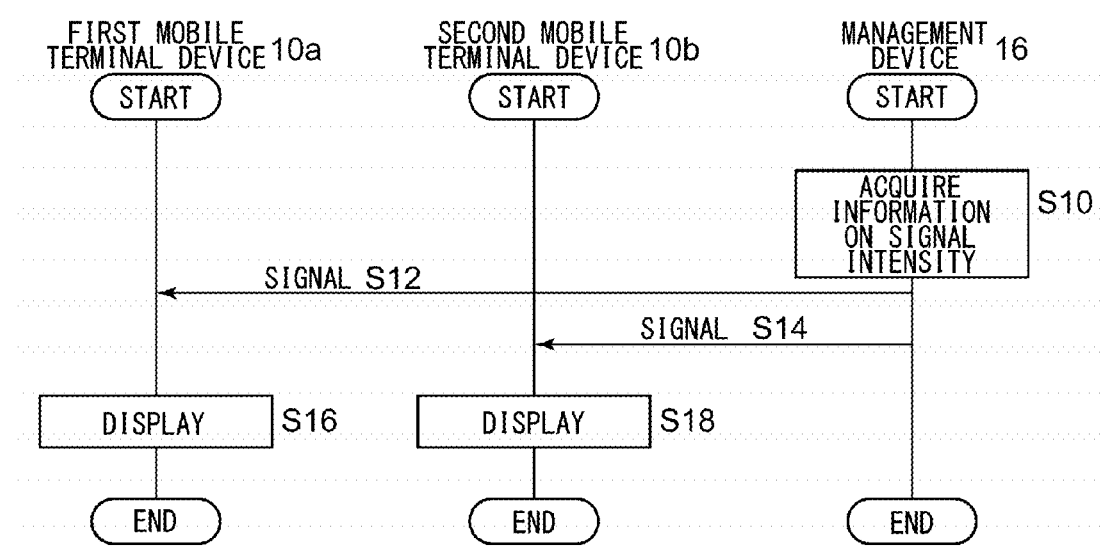
FIG. 8 is a sequence chart showing the steps of displaying performed by the communication system of FIG. 1.

A description will be given of an operation in the communication system 100 with the above-described configuration. FIG. 8 is a sequence chart showing the steps of displaying performed by the communication system 100. The management device 16 acquires information on signal intensity (S10). The management device 16 transmits a signal including the information on signal intensity to the first mobile terminal device 10a and the second mobile terminal device 10b (S12, S14). The signal may be broadcast. The first mobile terminal device 10a displays the image 50 (S16), and the second mobile terminal device 10b also displays the image 50 (S18).

This embodiment allows locating and displaying ease information related to the ease of communication with the base station device with which to communicate in an image. Therefore, information dependent on the surrounding environment can be displayed in an easy-to-understand manner. The ease information is displayed in the image, associating the latitude and longitude in the ease information with coordinates in the image so that recognition of the ease information is facilitated. The state of display is changed depending on the value indicated by the ease information so that recognition of the value indicated by the ease information is facilitated. The pattern of transparent color is changed depending on the value indicated by the ease information so that recognition of the value indicated by the ease information is facilitated. The signal intensity of a signal received from the base station device is used as ease information so that the quality of communication with the base station device can be estimated. A pattern of transparent color dependent on the signal intensity is displayed so that the user can know a position where the communication quality is improved. The ease information corresponding to each of a plurality of base station devices is displayed in the image so that, where signals from a plurality of base station devices can be received, the user can know which base station device the user should connect to to improve the communication quality.

The ease information mapped to the latitude and longitude is transmitted to the mobile terminal device so that the ease information can be displayed in the image captured in the mobile terminal device. The signal intensity of a signal from the base station device and received by the mobile terminal device is used as ease information so that an image in which each set of coordinates is mapped to the signal intensity can be displayed. The information on signal intensity for the base station device is displayed so that the user can know whether communication with other mobile terminal devices is enabled by referring to the distance or signal intensity in the augmented reality. The ease information on the base station device with a failure is excluded before transmission to the mobile terminal device so that the user of the mobile terminal device can move to a position where communication is enabled in accordance with the ease information on the other base station devices. The ease information to which information indicating a failure is appended is transmitted to the mobile terminal device so that the user of the mobile terminal device can easily recognize an area affected by the failure. The area of the base station device can be viewable in the augmented reality so that the user is prompted to move when communication is disabled. By allowing users to act on the user's own initiative in the event of a problem so that the problem can be promptly acted upon.

Embodiment 2

A description will now be given of Embodiment 2. As in Embodiment 1, the mobile terminal device according to Embodiment 2 uses AR technology to display ease information related to ease of communication with the base station device in a captured image. Ease information in Embodiment 1 is information on signal intensity. Ease information in Embodiment 2 is information on congestion level in base station devices. The communication system 100, the base station device 12, the mobile terminal device 10 according to Embodiment 2 are of the same type as those of FIGS. 1, 2, and 4. The following description concerns a difference from Embodiment 1.

The communication unit 66 of FIG. 2 receives, from each base station device 12, information on the number of mobile terminal devices 10 registered in the base station device 12 and information on the number of groups registered. The information is generically referred to as congestion level in the base station device 12. The communication unit 66 outputs a congestion level to the processing unit 62 and the processing unit 62 causes the storage unit 60 store the congestion level. Thus, the storage unit 60 stores the congestion level. Congestion level may be a value derived by dividing the number of mobile terminal devices 10 registered in the base station device 12 by the number of channels in the base station device 12 or a value derived by dividing the number of registered groups by the number of channels. In this case, congestion level can be said to be the number of mobile terminal devices 10 per one channel or the number of registered groups per one channel. Congestion level may be use rate of the resources provided in the base station device 12. For example, use rate of a communication channel per a unit time may be used. Alternatively, congestion level may be the number of requests, failures, or errors related to call origination/call incoming generated in the base station device 12. If the congestion level is low, communication with the base station device 12 is easy. If the congestion level is high, communication with the base station device 12 is difficult. For this reason, congestion level is an indicator for determining whether communication with the base station device 12 is easy and so can be said to be ease information.

Figure 9:
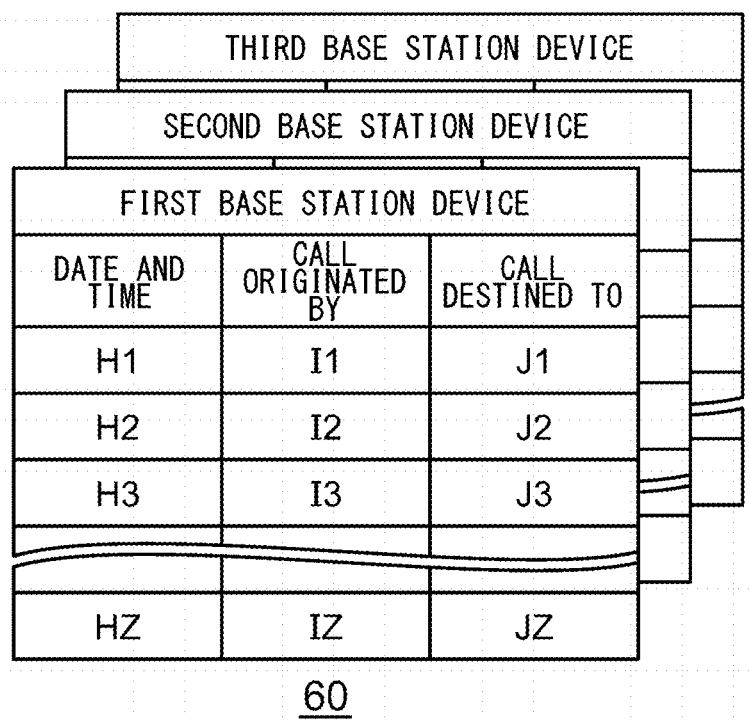
FIG. 9 shows a data structure of a database stored in the storage unit according to Embodiment 2.

The communication unit 66 may receive history information on calls in the base station device 12 from each base station device 12, and the processing unit 62 may cause the storage unit 60 to store the history information. FIG. 9 shows a data structure of a database stored in the storage unit 60 according to Embodiment 2. As shown in the figure, a history of calls in each mobile terminal device 10 is shown. Reference is made back to FIG. 2. The processing unit 62 calculates a congestion level from the history information stored in the storage unit 60 so that the history information can be said to be congestion level.

The processing unit 62 acquires the congestion level from the storage unit 60. Where the management device 16 is connected to a plurality of base station devices 12, the storage unit 60 stores a congestion level for each of the plurality of base station devices 12. Therefore, the processing unit 62 selects a congestion level that should be output to the base station device 12 from a plurality of congestion levels. For example, to output a congestion level to the first base station device 12a, the processing unit 62 selects the congestion level for the first base station device 12a. The congestion level for another base station device 12 may be selected, or the congestion level for a plurality of base station devices 12 may be selected. The processing unit 62 outputs the selected congestion level to the direction unit 64.

The direction unit 64 outputs the congestion level input from the processing unit 62 to the base station device 12 via the communication unit 66 and the network 14. The base station device 12 transmits the congestion level thus input. This allows the mobile terminal device 10 to display the image 50 in which the congestion level is mapped to each set of coordinates in the captured image.

The communication unit 22 of FIG. 4 receives a signal from the management device 16 by communicating with the base station device 12. The signal includes ease information (e.g., congestion level in the base station device 12). The communication unit 22 outputs the congestion level to the acquisition unit 24. The acquisition unit 24 acquires the congestion level from the communication unit 22 and outputs the congestion level to the processing unit 28.

The processing unit 28 receives the first positional information from the positioning unit 20, the congestion level from the acquisition unit 24, and the image from the imaging unit 26. The processing unit 28 superimposes the congestion level from the base station device 12 in an augmented space in the image by using AR technology. The specific steps are as described above and a description thereof is omitted. Thus, the processing unit 28 generates the image 50 in which each sets of coordinates is mapped to the congestion level.

FIG. 5 shows an exemplary image 50 generated by the processing unit 28. In the image 50, the scenery around the mobile terminal device 10 is shown and congestion levels associated with respective sets of coordinates are shown. Like the signal intensity, the congestion level is indicated by a pattern of transparent color superimposed on the image 50. The congestion level is reflected in color shades of the transparent color. For example, the lower the congestion level, the darker the transparent color, and, the higher the congestion level, the paler the transparent color. The relationship may be reversed.

Signal intensity for use as ease information varies depending on the distance from the base station device 12 and so varies depending on the coordinates in the image 50. This translates into different color shades of a transparent color depending on the portion in the image 50. Meanwhile, the congestion level for use as ease information does not vary depending on the distance from the base station device 12 and so remains unchanged in a range in which signals from the base station device 12 can be received. This translates into a constant color shade of transparent color. In addition to indicating the congestion level in the base station device 12 by color shades of a transparent color, an indicator indicating the congestion level may be displayed at an appropriate position in the screen. For example, the congestion level may be indicated by a numerical value between 0 and 100 or between 1-5. The congestion level may be indicated by the number of predetermined icons such as a star (*) and stars (**). Alternatively, the type of icon may be changed depending on the congestion level.

FIG. 6 shows another exemplary image 50 generated by the processing unit 28. The congestion level in the first base station device 12a is indicated by a pattern of color shades of reddish color. More particularly, the lower the congestion level, the darker the reddish color. The congestion level in the second base station device 12b is indicated by a pattern of color shades of bluish color. More particularly, the lower the congestion level, the darker the bluish color. If the user of the mobile terminal device 10 can find a place where the bluish color or the reddish color is displayed in a dark shade nearby, it is highly likely that the quality of communication can be improved by moving to that place for communication. This translates into selecting, for communication, the base station device 12 with a lower congestion level, i.e., the base station device 12 less frequently used. By allowing the user to move and change the mobile terminal device 10 for use, inequality in use rate among the mobile terminal devices 10 is corrected so that efficient operation of the communication system 100 as a whole is enabled.

The processing unit 28 may display the signal intensity and congestion level of the base station device 12 in combination. For example, the color group may be changed depending on the congestion level. For example, a lower congestion level may be indicated by blue and a higher congestion level may be indicated by red. The color shade may be varied depending on the magnitude of signal intensity. For example, the higher the signal intensity, the darker the color used, and, the lower the signal intensity, the paler the color used. By displaying the image 50 like this on the display unit 32, the user can know that the user may move to the dark bluish area in preference to the other areas. Therefore, the user can know the position that the user should move to easily and highly accurately.

The storage unit 60 of FIG. 2 may store the signal intensity of a signal received from the base station device 12 and also store the congestion level in the base station device 12. In this process, the processing unit 62 may derive, as ease information, a novel indicator (F) on the basis of the signal intensity (S) and the congestion level (C). For example, the novel indicator (F) may be derived as follows.

$$F = A \times S / C$$

where A is a constant. If the novel indicator (F) is large in value, communication with the base station device 12 is easy. If the novel indicator (F) is small in value, communication with the base station device 12 is difficult. The direction unit 64 causes the mobile terminal device to display the image 50 in which each set of coordinates is associated with the indicator, by causing the communication unit 66 to transmit the novel indicator (F) as ease information.

According to this embodiment, the congestion level in the base station device is used as ease information so that the level of smoothness of communication with the base station device can be estimated. The congestion level in the base station device is used so that congestion in the communication system can be relieved. Congestion in the communication system is relieved so that the mobile terminal device can be guided to a position where the operation efficiency of the communication system as a whole is likely to be improved. The congestion level in the base station device is transmitted as ease information to the mobile terminal device so that an image in which each set of coordinates is associated with the congestion level can be displayed in the mobile terminal device. By using an index in which signal intensity and congestion level are combined, more accurate information can be provided.

Embodiment 3

A description will now be given of Embodiment 3. As in the foregoing embodiments, the mobile terminal device according to Embodiment 3 uses AR technology to display ease information related to the ease of communication with the base station device in a captured image. In Embodiment 3, it is assumed that a plurality of mobile terminal devices form a group and the base station device assigns channels to the group. In this case, one of the mobile terminal devices in the group transmits signals using an upstream channel, and another mobile terminal device in the group receives signals using a downstream channel. The base station device assigns a pair of channels to one group regardless of the number of mobile terminal devices connected. Therefore, the smaller the number of base station device connected to the plurality of mobile terminal devices included in the same group, the higher the use efficiency of channels. Embodiment 3 is directed to improving the use efficiency of channels in group communication. The communication system 100, the base station device 12, the mobile terminal device 10 according to Embodiment 3 are of the same type as those of FIGS. 1, 2, and 4. The following description concerns a difference from the foregoing embodiments.

The communication unit 66 of FIG. 2 communicates with the base station device 12 so as to receive information on the mobile terminal devices 10 connected to the base station device 12 and on groups in which the mobile terminal devices 10 are included. The communication unit 66 outputs the received information to the processing unit 62. The processing unit 62 causes the storage unit 60 to store the information.

FIG. 10 shows a data structure of a database stored in the storage unit 60 according to Embodiment 3. As illustrated, correspondence between "group," "base station device 12," and "mobile terminal device 10" is shown, and "latitude and longitude" of positions where the mobile terminal devices 10 are located are also shown. In a situation like that of FIG. 10, the first mobile terminal device 10a through fourth mobile terminal device 10d included in the same group are connected to the first base station device 12a so that the first base station device 12a uses channels efficiently. However, the fifth mobile terminal device 10e belonging to the same group is connected alone to the second mobile terminal device 10b so that the second base station device 12b is not using channels efficiently. Reference is made back to FIG. 2.

The identification unit 68 refers to the database stored in the storage unit 60 and identifies the base station device 12 to which only one of the plurality of mobile terminal devices 10 included in a group is connected, and also identifies the base station device 12 to which a plurality of mobile terminal devices 10 included in the group are connected. In the case of FIG. 10, the former step results in identifying the second base station device 12*b* and the latter step results in identifying the first base station device 12*a*. In the former step, the base station device 12 to which a certain number of mobile terminal devices 10 or fewer are connected may be identified. In each of these steps of identification, a plurality of base station devices 12 may be identified.

The identification unit 68 refers to the database stored in the storage unit 60 and acquires the positional information on the mobile terminal device 10 connected alone to the base station device 12 identified in the former step. The identification unit 68 also recognizes a range (area) reached by radio waves of the base station device 12 identified in the latter step. Following this, the identification unit 68 derives the shortest distance between the position indicated by the acquired positional information and the identified area (spots included in the area). If the derived shortest distance is smaller than a threshold value, the identification unit 68 determines to move the mobile terminal device 10 connected alone to the base station device 12 identified in the former step to the base station device 12 identified in the latter step. This translates into identifying the mobile terminal device 10 that should leave the base station device 12 currently connected and should be connected to another the base station device 12 currently not connected yet. Meanwhile, if the derived shortest distance is equal to or larger than the threshold value, the identification unit 68 does not perform the process for identification.

In accordance with the determination in the identification unit 68, the processing unit 62 acquires ease information on the other base station device 12 not connected yet from the storage unit 60. The ease information may be signal intensity, congestion level, or a combination thereof. The direction unit 64 directs the communication unit 66 to transmit the ease information acquired by the processing unit 62 to the mobile terminal device 10 identified by the identification unit 68. Through these steps, the display unit 32 of the mobile terminal device 10 identified by the identification unit 68 displays the ease information on the other base station device 12 in the image 50.

The communication unit 22 of FIG. 4 receives a signal from the management device 16 by communicating with the base station device 12. The signal includes ease information on the other base station device 12 different from the base station device 12 currently connected and not yet accessed for communication. The communication unit 22 outputs the ease information to the acquisition unit 24. The acquisition unit 24 acquires the ease information from the communication unit 22 and outputs the ease information to the processing unit 28.

The processing unit 28 receives the first positional information from the positioning unit 20, the ease information from the acquisition unit 24, and the image from the imaging unit 26. The processing unit 28 superimposes the ease information from the base station device 12 in an augmented space in the image by using AR technology. In other words, the processing unit 28 places the ease information on the other base station device 12 not yet accessed for communication in the image, instead of the ease information on the currently connected base station device 12. In this case, the image 50 as shown in FIG. 7 is generated. In this process, a message recommending the user to move to an area of the other base station device 12 not yet accessed for communication may be placed. If the user of the mobile terminal device 10 seeing the image 50 displayed on the display unit 32 moves in a direction indicated by the ease information, the mobile terminal device 10 is connected to the other base station device 12.

Figure 11:
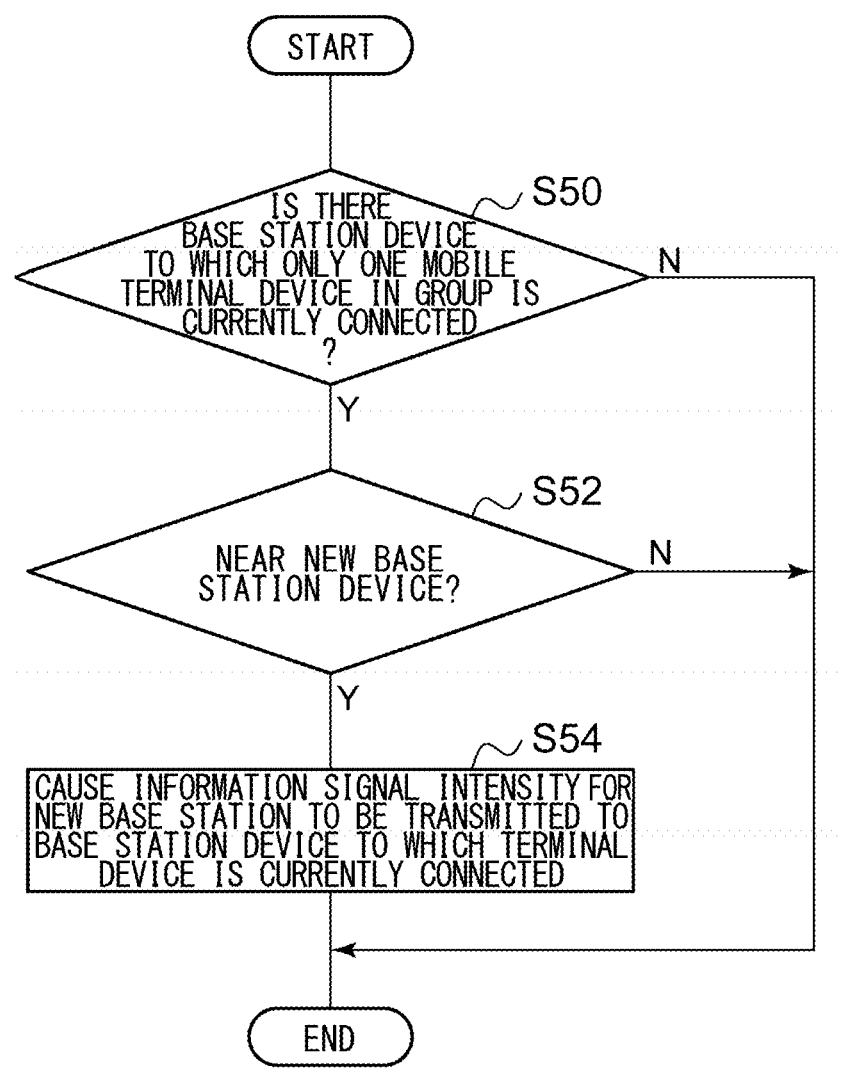
FIG. 11 is a flowchart showing the steps of direction performed by the management device according to Embodiment 3.

A description will now be given of an operation in the communication system 100 with the above-described configuration. FIG. 11 is a flowchart showing the steps of direction performed by the management device 16 according to Embodiment 3. If a base station device 12 to which only one of the mobile terminal devices 10 included in a group is currently connected is available (Y in S50), and if the mobile terminal device 10 is located near a new base station device 12 (base station device that is a candidate of destination of movement) (Y in S52), the direction unit 64 causes the information on signal intensity for the new base station device 12 to be transmitted to the base station device 12 to which the terminal device 10 is currently connected (S54). Meanwhile, if a base station device 12 to which only one of the mobile terminal devices 10 included in a group is currently connected is available (N in S50), or if the mobile terminal device 10 is not located near the new base station device 12 (N in S52), step 54 is skipped.

For brevity of description, the description above assumes that only one mobile terminal device 10 included in a group is connected to the base station device 12, but a similar process may be performed if a plurality of mobile terminal devices 10 are connected to the base station device 12. For example, if 20 mobile terminal devices 10 are in a group, of which 17 are connected to the first base station device 12*a* and the remaining 3 are connected to the second base station device 12*b*, a similar process may also be performed. Guidance information for changing the destination of connection is presented to the mobile terminal devices 10 (three terminal devices subject to the process) currently connected to one of the two base station devices 12 (second base station device 12*b*) with fewer mobile terminal devices 10 connected. Whether to provide guidance information for changing the base station device 12 for use may be determined whether the number of mobile terminal devices subject to the process is equal to less than a predetermined value (e.g., 5 or fewer), or whether the proportion of the number of mobile terminal devices subject to the process in the number of mobile terminal devices in the group as whole is equal to or less than a predetermined value (e.g., 20% or less). In the case that the group uses three or more base station devices 12, the base station device 12 with the fewest mobile terminal devices 10 is identified. A similar process is performed on the mobile terminal devices 10 connected to the identified base station device 12.

The process described in this embodiment is directed to changing the base station device 12 used by mobile terminal devices 10 included in a particular group. Alternatively, it is possible to change the base station device 12 used by a particular mobile terminal device 10 in a wireless system where no groups are defined. For example, the management device 16 may examine mobile terminal devices 10 currently using a given relatively congested base station device 12 and identify a mobile terminal device 10 located at a place where connection with another less congested base station device 12 is enabled, i.e., an area where the signal intensity of the base station device 12 is relatively high. The management device 16 may provide the ease information on the other base station device to the identified mobile terminal device 10. The mobile terminal device 10 provided with the ease information generates and displays the image 50 as shown in, for example, FIG. 7. Consequently, the mobile terminal device 10 using the base station device 12 with a high congestion level can be guided to the other base station device 12 with a low congestion level so that the congestion level in the system as a whole is relieved. In other words, the operation efficiency of the system as a whole can be improved by providing the mobile terminal device 10 satisfying a certain condition with the ease information on the base station device 12 for which communication is relatively easy.

In accordance with this embodiment, the base station device connected to only some of a plurality of mobile terminal devices included in a group is identified and the identified mobile terminal device is moved to the area of another base station device connected to other mobile terminal devices. Therefore, the use efficiency of channels is improved. The identified mobile terminal device is moved to the area of the other base station device connected to the other mobile terminal devices so that the volume of communication in the communication system as a whole can be reduced. Since the volume of communication in the communication system as a whole is reduced, the frequency of occurrence of communication disabled states (busy states) can be reduced.

Embodiment 4

A description will be given of Embodiment 4. As in the foregoing embodiments, the mobile terminal device according to Embodiment 4 uses AR technology to display information in a captured image. In the foregoing embodiments, information related to the base station device is displayed. Meanwhile, according to Embodiment 4, icons indicating other mobile terminal devices (hereinafter, referred to as "other device icons") are also displayed. For this reason, the user of the mobile terminal device can understand the ease of communication with other mobile terminal devices in an environment shown in the image by viewing the displayed image. The communication system 100, the base station device 12, the mobile terminal device 10 according to Embodiment 4 are of the same type as those of FIGS. 1, 2, and 4. The following description concerns a difference from the foregoing embodiments.

The acquisition unit 24 of FIG. 4 measures the signal intensity of a signal from the base station device 12 received by the communication unit 22. The acquisition unit 24 outputs the measured signal intensity to the processing unit 28. The processing unit 28 receives the first positional information from the positioning unit 20, receives the signal intensity from the acquisition unit 24, and outputs a combination thereof to the communication unit 22. The communication unit 22 receives the combination of the first positional information and the signal intensity from the processing unit 28 and transmits a signal including the combination to the management device 16 via the base station device 12. The management device 16 causes the storage unit 60 to store the first positional information and the signal intensity included in the signal from the plurality of mobile terminal devices 10.

FIG. 12 shows a data structure of a database stored in the storage unit 60 according to Embodiment 4. "ID" indicates identification information for identifying each mobile terminal device 10. As illustrated, the positional information, signal intensity, etc. for each of a plurality of mobile terminal devices 10 are stored. The management device 16 transmits the positional information, signal intensity, etc. for each of the plurality of mobile terminal devices 10 to the mobile terminal devices 10. Reference is made back to FIG. 3.

The communication unit 22 receives a signal from the base station device 12 and, of the information included in the received signal, outputs the other device information related to the other mobile terminal devices 10 to the processing unit 28. The other device information includes the positional information (hereinafter, referred to as "second positional information") and signal intensity of the other mobile terminal devices 10. As described above, the processing unit 28 generates the image 50 as shown in FIG. 5 through FIG. 7. Further, the processing unit 28 converts the second positional information from the communication unit 22 into coordinates, using the correspondence between coordinates in the image and the latitude/longitude. Further, the processing unit 28 places the other device icon at the post-conversion coordinates in the image. In other words, the processing unit 28 places the other device icons indicating the other mobile terminal devices 10 in the image, associating the second positional information with coordinates in the image.

Figure 13:
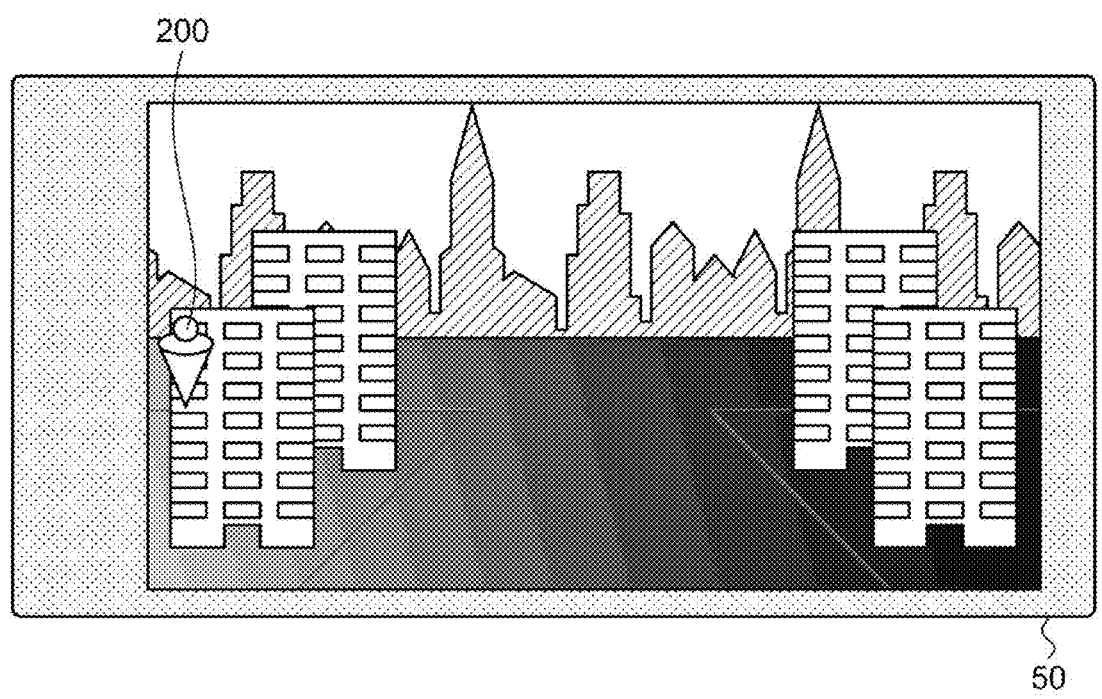
FIG. 13 shows the image generated by the processing unit according to Embodiment 4.

FIG. 13 shows the image 50 generated by the processing unit 28 according to Embodiment 4. As in the image 50 shown in FIG. 5, the signal intensity at each set of coordinates is indicated by color shades of a transparent color according to the database stored in the storage unit 60 shown in FIG. 3. In addition, another device icon 200 is placed. As described in Embodiment 2, the congestion level in the base station device 12 may be shown. The user of the mobile terminal device 10 according to this embodiment can estimate the signal intensity or congestion level at positions where the other mobile terminal devices 10 are located by viewing the image 50 displayed on the display unit 32. Therefore, the user can estimate the quality of communication in the other mobile terminal devices 10. Reference is made back to FIG. 4.

Figure 14:
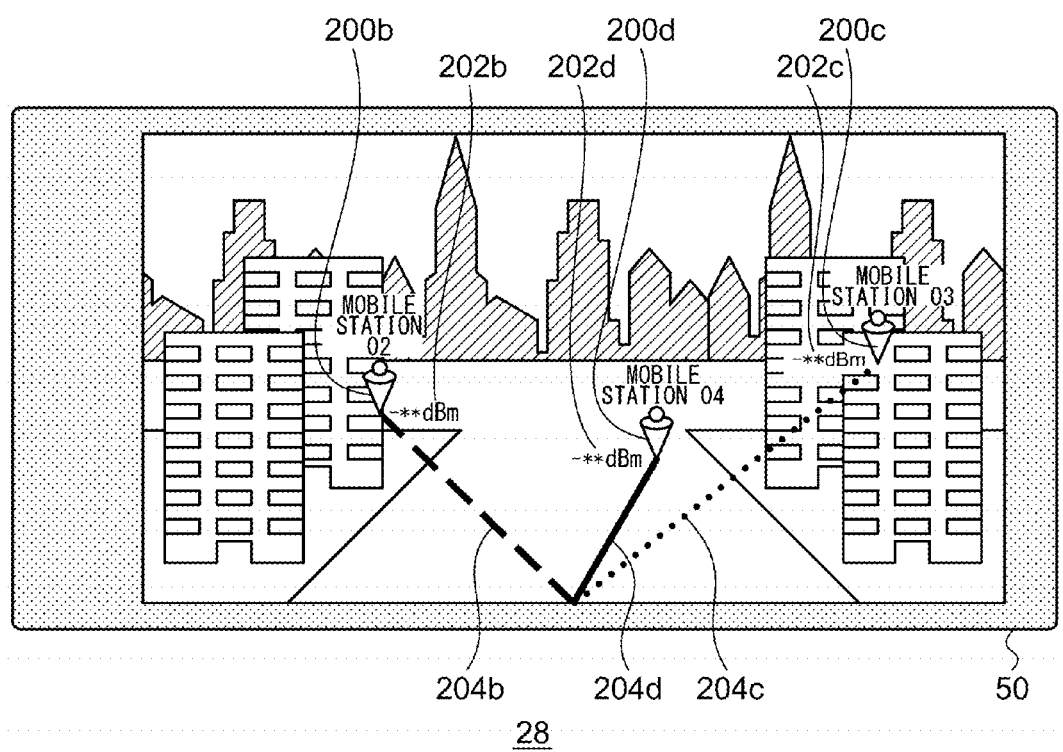
FIG. 14 shows another image generated by the processing unit according to Embodiment 4.

The image 50 generated in the processing unit 28 may not be synthesized with a pattern of transparent color as shown in FIG. 5 through FIG. 7. FIG. 14 shows another image 50 generated by the processing unit 28 according to Embodiment 4. The image 50 shows a scenery around the first mobile terminal device 10a (the mobile terminal device 10 according to this embodiment). Further, the second other device icon 200b, the third other device icon 200c, the fourth other device icon 200d, which are generically referred to as other device icons, are shown in the scenery in the image 50. The second other device icon 200b is an icon for indicating the second mobile terminal device 10b, the third other device icon 200c is an icon for indicating the third mobile terminal device 10c, and the fourth other device icon 200d is an icon for indicating the fourth mobile terminal device 10d. Therefore, the second other device icon 200b is placed at the coordinates corresponding to the latitude and longitude in the second positional information from the second mobile terminal device 10b. The same is true of the third other device icon 200c and the fourth other device icon 200d.

The processing unit 28 places the information on signal intensity acquired by the communication unit 22 in the image 50, in association with each other device icon 200. Further, the processing unit 28 draws a transmission channel line 204 leading to each other device icon 200 to indicate that communication is enabled, defining the bottom center of the image 50 as the position of the first mobile terminal device 10a. Unlike the actual communication channel, the transmission channel line 204 directly connect the first mobile terminal device 10a to the other device icons 200.

To describe it more specifically, second other device information 202b is placed in the image 50 in association with the second other device icon 200b, and the second other device information 202b indicates the signal intensity for the second mobile terminal device 10b. A second transmission channel line 204b is placed between the first mobile terminal device 10a and the second other device icon 200b. Such display scheme is also used for the third other device icon 200c and the fourth other device icon 200d. The second other device information 202b, third other device information 202c, and fourth other device information 202d are generically referred to as other device information 202. The second transmission channel line 204a, a third transmission channel line 204c, and a fourth transmission channel line 204d are generically referred to as transmission channel lines 204.

The processing unit 28 changes the state of display of the transmission channel line 204 in accordance with the value of signal intensity. The state of display includes color shades, color difference, type of line, boldness of line, etc. For example, the higher the signal intensity, the darker the color or the bolder the line that the processing unit 28 uses. Thus, the processing unit 28 changes the state of display of signal intensity in accordance with the value of signal intensity acquired by the communication unit 22. Thus, the transmission channel line 204 is displayed such that the type of line (solid line/dotted line) or the color of line (dark color/pale color, or different colors) is changed. Different colors may be assigned to different other device icons 200.

For example, the second other device icon 200b that is relatively remote and blocked from view by a building is associated with a slightly low signal intensity of received signals so that the second transmission channel line 204b is represented by a dotted line of a slightly pale color with a small gap between dots. The third other device icon 200c that is remote and completely blocked from view by a building is associated with a low signal intensity of received signals so that the third transmission channel line 204c is represented by a dotted line of a pale color with a wide gap between dots. If the signal intensity is small, the user of the first mobile terminal device 10a may determine to guide the other party to move from behind the building, by viewing the image 50 displayed. Thus, for example, the user may give out a message like "please move east about 30 m to move from behind the building" to the third mobile terminal device 10c associated with the third other device icon 200c. As the third mobile terminal device 10c moves in that direction, the quality of communication can be easily improved. Meanwhile, the fourth other device icon 200d located nearby and at a place with good visibility is associated with a high signal intensity of received signals so that the fourth transmission channel line 204d is represented by a dark solid line. Reference is made back to FIG. 4.

Figure 15:
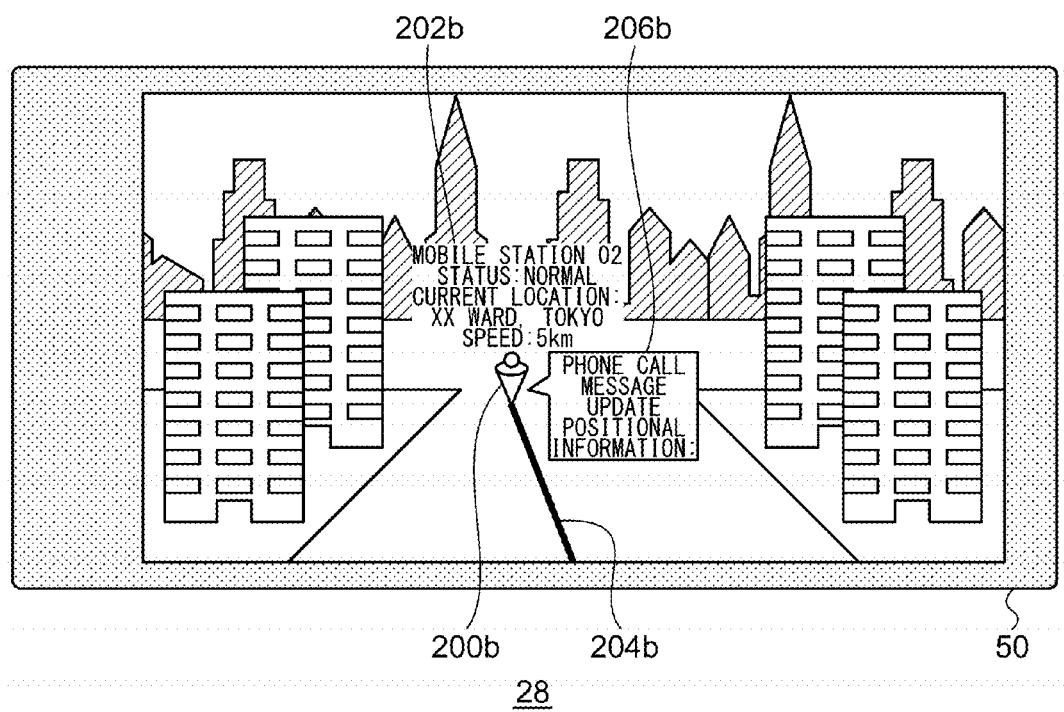
FIG. 15 shows another image generated by the processing unit according to Embodiment 4.

If the signal from the base station device 12 includes information on the status of another mobile terminal device 10 in the surrounding environment, the acquisition unit 24 may acquire such information (hereinafter, referred to as "status information") from the signal received by the communication unit 22. The acquisition unit 24 outputs the status information to the processing unit 28, and the processing unit 28 places the status information in the image 50 in association with the other device icon 200. FIG. 15 shows another image 50 generated by the processing unit 28 according to Embodiment 4. The second other device information 202b is placed in association with the second other device icon 200b. Aside from the signal intensity described above, the name/status/location/speed/direction/positional information update time and date, etc. can be displayed as the second other device information 202b. If the second other device icon 200b as displayed is selected by, for example, a tap, a second sub-menu 206b is shown in association with the second other device icon 200b. Instructions like phone call/message/transmit are shown in the second sub-menu 206b. By selecting, for example, "phone call" from the second sub-menu 206, a phone call with the second mobile terminal device 10b is initiated.

According to this embodiment, the other device icon is displayed in the image so that ease of communication with other mobile terminal device can be made known. The other device icon is displayed at the coordinates of the position of the other mobile terminal device so that the position of the other mobile terminal device is known easily merely by viewing the image. The signal intensity is displayed as the information related to the status of the other mobile terminal device in the environment shown in the image so that the quality of communication with the other mobile terminal device is known by association. The state of display is changed depending on the signal intensity so that the signal intensity is displayed in an easy-to-understand manner. Since the signal intensity is displayed, an instruction on a position of proper communication environment can be given. The other device icon and signal intensity are displayed so that the user can know whether communication with the other mobile terminal device is enabled by referring to the distance in the augmented reality or signal intensity.

Embodiment 5

A description will now be given of Embodiment 5. As in Embodiment 4, the mobile terminal device according to Embodiment 5 uses AR technology to display other device icons representing other mobile terminal devices in a captured image. In Embodiment 5, the mobile terminal device receives status information indicating an emergency status from other mobile terminal devices and displays the emergency status in a recognizable manner. The communication system 100, the base station device 12, the mobile terminal device 10 according to Embodiment 5 are of the same type as those of FIGS. 1, 2, and 4. The following description concerns a difference from the foregoing embodiments.

The communication unit 22 receives a signal from the base station device 12. The received signal includes, as other device information, the status information of other mobile terminal devices 10. The acquisition unit 24 acquires the status information received by the communication unit 22. The status information represents information on the status of other mobile terminal devices 10 in the environment shown in the image captured by the imaging unit 26. The status information indicates emergency information. Emergency information represents information output from other mobile terminal devices 10 as emergency notification and is grouped into "EMERGENCY information" and "EMERGENCY MAN-DOWN information." Both represent information indicating urgent situation or emergency. "EMERGENCY information" is output when the user of the other mobile terminal device 10 performs a certain operation. "EMERGENCY MAN-DOWN information" is automatically output when the user carrying the other mobile terminal device 10 falls over. A publicly known technology may be used to output emergency information from the other mobile terminal devices 10 so that a description thereof is omitted. The acquisition unit 24 outputs the emergency information to the processing unit 28.

Figure 16:
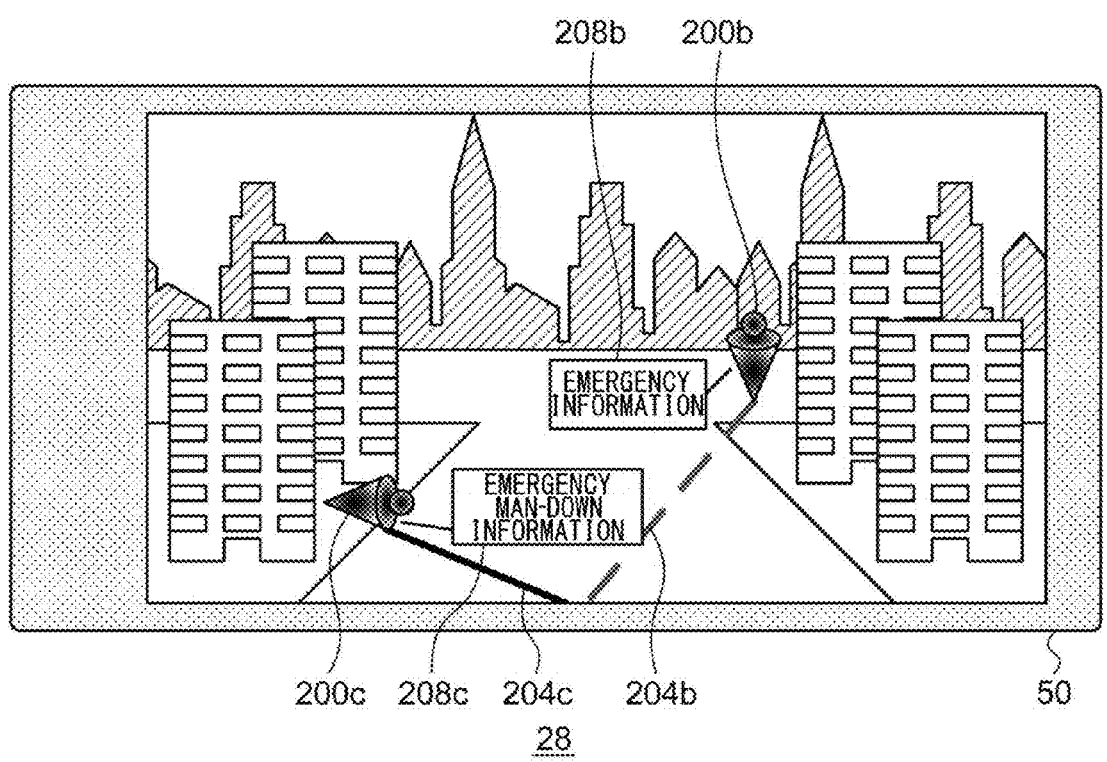
FIG. 16 shows the image generated by the processing unit according to Embodiment 5.

The processing unit 28 additionally receives emergency information (status information) from the acquisition unit 24. The processing unit 28 generates the image 50 by placing the input emergency information in association with the other device icons 200. FIG. 16 shows the image 50 generated by the processing unit 28 according to Embodiment 5. The image 50 is shown as in FIG. 14, etc. It is assumed here that emergency information is acquired from the second mobile terminal device 10b and the third mobile terminal device 10c. The processing unit 28 displays the second other device icon 200b in FIG. 16 in a display state different from that of the second other device icon 200b in FIG. 14 in order to place the emergency information in association with other device icons 200. In other words, the other device icons 200 associated with other mobile terminal devices 10 from which the emergency information is received are displayed in a more noticeable manner in distinction from the other device icons 200 for the other mobile terminal devices 10 in a normal state.

It is assumed that the emergency information from the second mobile terminal device 10b is "EMERGENCY information" and the emergency information from the third mobile terminal device 10c is "EMERGENCY MAN-DOWN information." Therefore, the third other device icon 200c is an icon of a shape showing the user falling over and is displayed in a state different also from that of the second other device icon 200b. Second status information 208b is placed in association with the second other device icon 200b, and third status information 208c is placed in association with the third other device icon 200c. The second status information 208b shows "EMERGENCY information," and the third status information 208c shows "EMERGENCY MAN-DOWN information."

If the degree of urgency (degree of seriousness) of emergency information is categorized into a plurality of levels, the color or shape of the other device icon 200 may be changed depending on the level. Depending on the emergency information, the other device icon 200 may be displayed steadily/changed/blinked/displayed with a changed or blinked background color/displayed in a large size/not displayed. The presentation scheme may be changed or combined. Alternatively, an alert sound may be output. The emergency information may be displayed in all mobile terminal devices 10 receiving the emergency information. Alternatively, the emergency information may be displayed only in those mobile terminal devices 10 in the same group as the mobile terminal device 10 originating the emergency information. Reference is made back to FIG. 4.

The image 50 generated by the processing unit 28 may be different from that of FIG. 16. As mentioned above, the user of the mobile terminal device 10 originating the EMERGENCY MAN-DOWN information has fallen over so that the user is often at a low position. Therefore, the user is blocked from view by other objects or buildings so that the other device icon 200 for the mobile terminal device 10 originating the EMERGENCY MAN-DOWN information is not placed in the image 50. This is addressed by causing the second mobile terminal device 10b to capture an image of the user of the third mobile terminal device 10c originating the EMERGENCY MAN-DOWN information, if it is possible to capture the image by the imaging unit 26 of the second mobile terminal device 10b. The second mobile terminal device 10b transmits the image capturing the user of the third mobile terminal device 10c (hereinafter, referred to as "photo image") to the first mobile terminal device 10a via the base station device 12. The communication unit 22 of the first mobile terminal device 10a additionally receives the photo image. The acquisition unit 24 acquires the photo image received by the communication unit 22 and outputs the image to the processing unit 28.

Figure 17:
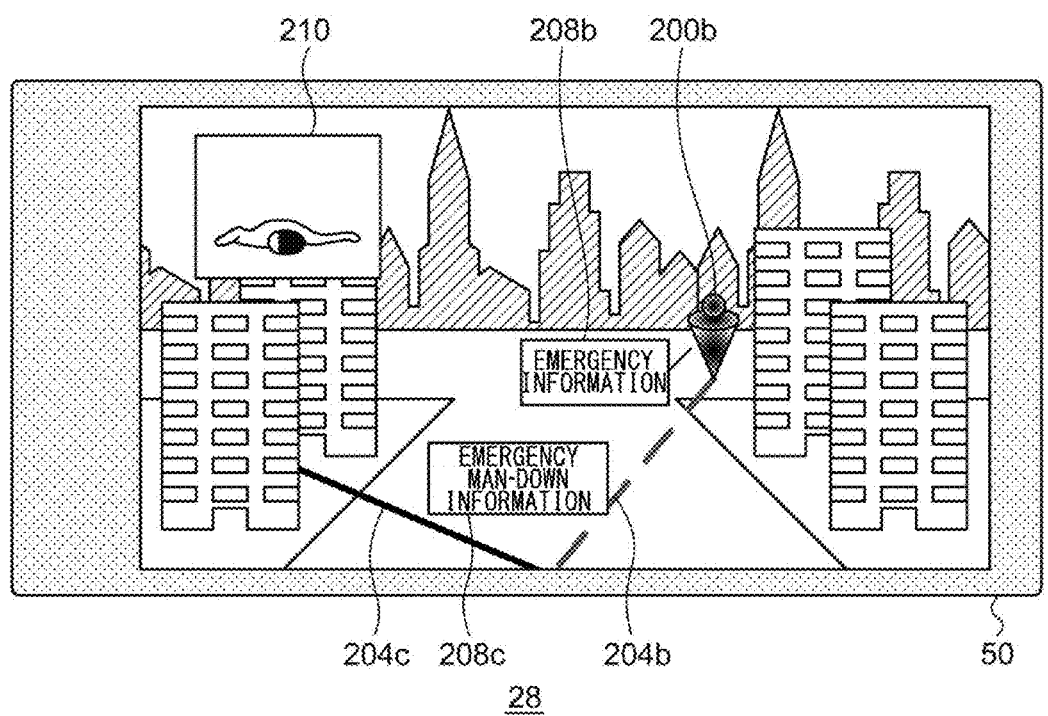
FIG. 17 shows another image generated by the processing unit according to Embodiment 5.

The processing unit 28 generates the image 50 like that of FIG. 16. In this process, the processing unit 28 merges the photo image acquired from the acquisition unit 24. FIG. 17 shows another image 50 generated by the processing unit 28 according to Embodiment 5. The third other device icon 200c is not placed in the image because the associated terminal is blocked from view by a building. Instead, a photo image 210 captured by the second mobile terminal device 10b is shown. The second mobile terminal device 10b may generate an image (image like that of FIG. 16) in which the third mobile terminal device 10c is placed in an augmented space as viewed from the second mobile terminal device 10b, by using the positional information on the third mobile terminal device 10c, the information on the position and direction of the second mobile terminal device 10b, and the information on the angle of view of the imaging unit 26 of the second mobile terminal device 10b, and may transmit the generated image to the first mobile terminal device 10a. In this process, drawing of the transmission channel line 204 is omitted. Reference is made back to FIG. 4.

In the event that the other device icon 200 for the mobile terminal device 10 originating the EMERGENCY MAN-DOWN information is not placed in the image 50, the processing unit 28 may place the other device icon 200 at alternative coordinates different from the coordinates derived based on the first positional information and the second positional information. In this process, the processing unit 28 also places information related to the relationship between the alternative coordinates and the original coordinates (hereinafter, referred to as "coordinate information") in association with the other device icon 200. In other words, the other device icon 200 is placed at a position different from the position where the other mobile terminal device 10 is actually located. The position of the other mobile terminal device 10 relative to the display position of the other device icon 200 is placed in the form of character information.

Figure 18:
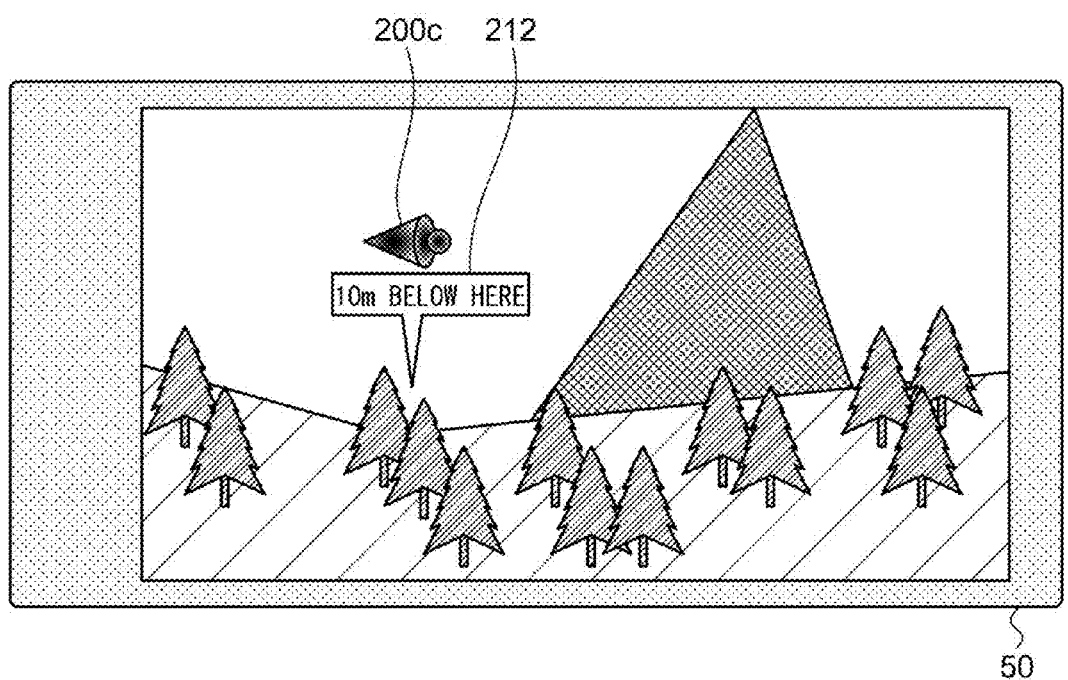
FIG. 18 shows another image generated by the processing unit according to Embodiment 5.

FIG. 18 shows another image 50 generated by the processing unit 28 according to Embodiment 5. For example, if the third mobile terminal device 10c is located at a position of latitude x, longitude Y, and altitude Z (all units are [m]), the processing unit 28 places the third other device icon 200c at a position 10 m higher in altitude (Z+10 m). Further, the processing unit 28 places coordinate information 212 showing characters like "10 m below here" in the neighborhood of the third other device icon 200c. This makes it easy to identify the position of the user of the other mobile terminal device 10 falling over behind a building.

Figure 19:
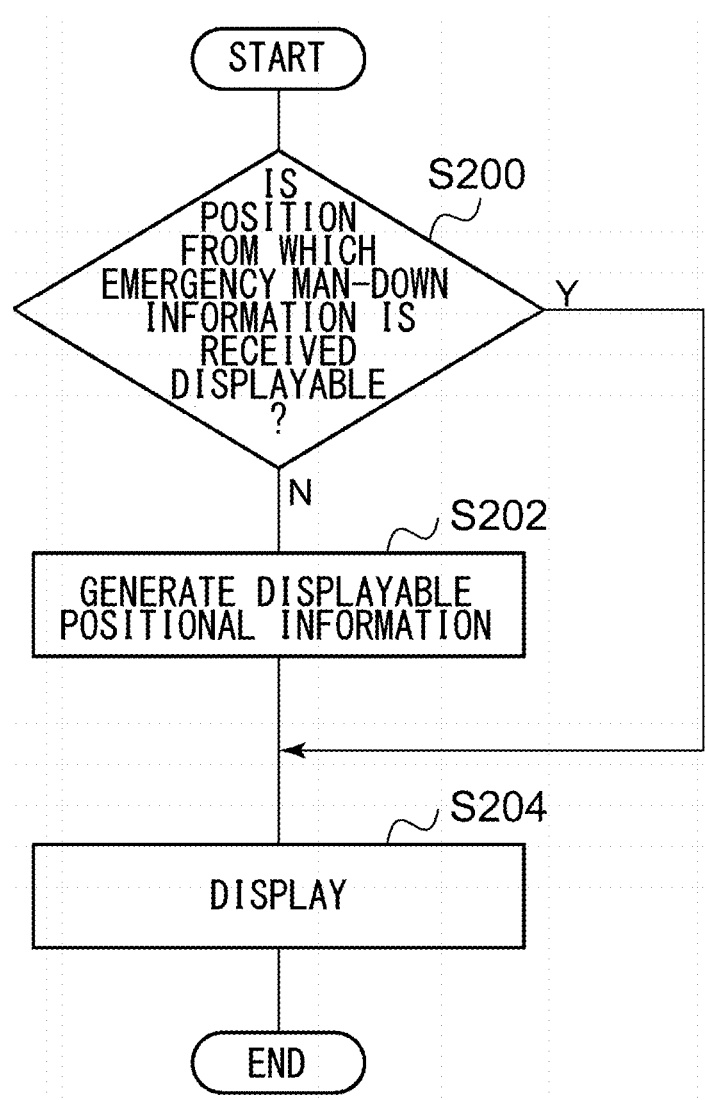
FIG. 19 is a sequence chart showing the steps of displaying performed by the processing unit according to Embodiment 5.

A description will now be given of an operation in the communication system 100 with the above-described configuration. FIG. 19 is a sequence chart showing the steps of displaying performed by the processing unit 28 according to Embodiment 5. If the position of the other mobile terminal device 10 from which the EMERGENCY MAN-DOWN information is acquired cannot be displayed in the image 50 (N in S200), the processing unit 28 increases the altitude, or the like, and generates positional information that can be displayed in the image 50, based on the position of the host mobile terminal device 10 (S202). If the user carrying the other mobile terminal device 10 from which the EMERGENCY MAN-DOWN information is acquired can be displayed in the image 50 (Y in S200), step 202 is skipped. The storage unit 30 displays the image 50. In other words, if the status of the mobile terminal device 10 meets a certain condition, the position of that mobile terminal device 10

(actual position) may be changed to the position (position for display) that can be displayed in the augmented space of the display screen before being displayed. In this process, information related to a difference (relationship) between the actual position and the position for display may be displayed.

According to this embodiment, the status information from other mobile terminal devices is displayed in association with other device icons, as the information related to the status of the other mobile terminal devices in the environment shown in the image. Therefore, information dependent on the surrounding environment can be displayed in an easy-to-understand manner. In further accordance with this embodiment, when the EMERGENCY information is acquired, the other device icon is displayed in association so that a notification can be given to indicate that the user carrying the associated mobile terminal device is in an emergency status. When the EMERGENCY MAN-DOWN information is acquired, the other device icon is displayed in association so that a notification can be given to indicate that the user carrying the other mobile terminal device is in an EMERGENCY MAN-DOWN status.

Since the image capturing the user carrying the other mobile terminal device originating the EMERGENCY MAN-DOWN information is transmitted from still another mobile terminal device, the presence of the user can be identified even if the user has fallen over and so is blocked from view by an obstacle. Since the other device icon, with its position converted so as to be displayable, is displayed and the relationship between the pre-conversion and post-conversion positions is also displayed, the other device icon is displayed and, also, the true position is made known, even if the other device icon is blocked from view by an obstacle. The status, place, distance, etc. of mobile terminal devices including emergency can be identified in the augmented reality. The emergency status can be displayed in an intuitive, easy-to-understand manner regardless of objects surrounding the mobile terminal devices.

Described above is an explanation based on an exemplary embodiment. The embodiment is intended to be illustrative only and it will be obvious to those skilled in the art that various modifications to constituting elements and processes could be developed and that such modifications are also within the scope of the present invention.

According to Embodiments 1 through 5, a wireless business system is used in the communication system 100. Alternatively, wireless communication systems other than a business wireless system may be used, for example. In other words, any wireless communication system that allows mobile terminal devices 10 to communicate with each other without being mediated by a base station device may serve the purpose. According to this variation, the flexibility of the system can be improved.

According to Embodiments 1 through 5, the management device 16 is configured to be separate from the base station device 12 and is connected to the base station device 12 via the network 14. Alternatively, management device 16 and the base station device 12 may be formed so as to be integrated with each other such that the management device 16 is included in the base station device 12. According to this variation, the flexibility of the system can be improved.

What is claimed is:

1. A mobile terminal device adapted to perform communication via a base station device, comprising:
a camera that captures a first image around the mobile terminal device to generate a surrounding image;
a memory storing a program, wherein the program when executed by a computer, causes the computer to perform operations comprising:
identifying a first position and a viewing direction of the mobile terminal device to generate first positional information including the first position and the viewing direction identified;
acquiring second positional information indicating a second position of another mobile terminal device to communicate with and a signal intensity information on a radio signal transmitted from the base station device in a predetermined range including the second position indicated by the second positional information;
acquiring data indicating a congestion level of the base station device in the predetermined range including the second position indicated by the second positional information, wherein the congestion level includes a first value derived by dividing a number of mobile terminal devices registered in the base station device by a number of channels in the base station device or a second value derived by dividing a number of communication groups registered in the base station device by the number of channels in the base station device;
converting the second positional information into coordinates in the surrounding image based on the first positional information and the second positional information;
converting the signal intensity information into the coordinates in the surrounding image;
generating a second image by synthesizing the surrounding image, the signal intensity information as converted, and an icon corresponding to the another mobile terminal device located at the coordinates and setting a hue of a display color of the second image in accordance with the congestion level and setting a color shade of the display color of the second image in accordance with the signal intensity; and
a display that displays the second image generated by the computer.

2. The mobile terminal device according to claim 1, wherein
the second image is generated such that a higher signal intensity is represented by using a darker transparent color at the coordinates where the icon is located.

3. The mobile terminal device according to claim 1, wherein
the second image generation operation further comprising:
further synthesizing a transmission line that connects the first position of the mobile terminal device and the second position of the another mobile terminal device by a straight line and changing a mode of display of the transmission line in accordance with a value of the signal intensity.

4. The mobile terminal device according to claim 3, wherein a higher signal intensity to is represented by using a darker color for the transmission line or a bolder transmission line.

5. The mobile terminal device according to claim 1, wherein the computer performs further operations comprising:
acquiring status information related to the another mobile terminal device, and
generating the second image, in which information on at least one of a name, status, location, speed, and moving direction of the another mobile terminal device included in the status information is further shown by being associated with the icon.

6. The mobile terminal device according to claim 1, wherein the computer performs further operations comprising:
when the icon is selected by a user, causing the display to display a menu to start communication with the another mobile terminal device corresponding to the icon.

7. The mobile terminal device according to claim 1, wherein the computer performs further operations comprising:
acquiring status information indicating that the another mobile terminal device is in an emergency status, and
when the another mobile terminal device is in the emergency status, positioning the icon at coordinates corresponding to a position higher in altitude than an actual altitude of the another mobile terminal device included in the second positional information.

8. A management device adapted to manage a base station device capable of communicating with a mobile terminal device, comprising:
a first memory that stores positional information on a plurality of spots and signal intensities of a radio signal transmitted from the base station device at respective spots of the plurality of spots, mapping the positional information to the signal intensities;
a second memory that stores a congestion level in each base station device;
a computer that:
acquires data from the first memory and the second memory;
derives, in association with the positional information and based on a signal intensity and the congestion level, an indicator indicating ease of communication between the mobile terminal device and the base station device at a position indicated by the positional information by multiplying a predetermined constant by a value derived by dividing the signal intensity by the congestion level, wherein a higher the signal intensity corresponds to a larger value of the indicator, and a smaller congestion level corresponds to a larger value of the indicator; and
causes the indicator derived by the computer and the positional information to be transmitted to the mobile terminal device via the base station device, wherein the indicator is used for displaying information related to the ease of communication in an image captured in the mobile terminal device such that the positional information is mapped to coordinates in the image.

9. A management device adapted to manage a base station device capable of communicating with a mobile terminal device, comprising:
a first memory that stores positional information on a plurality of spots and signal intensities of a radio signal transmitted from the base station device at respective spots of the plurality of spots, mapping the positional information to the signal intensities;
a second memory that stores a congestion level in each base station device, wherein the second memory stores, as the congestion level, a first value derived by dividing a number of mobile terminal devices registered in the base station device by a number of channels in the base station device or a second value derived by dividing a number of communication groups registered in the base station device by the number of channels in the base station device;
a computer that:
acquires data from the first memory and the second memory;
derives, in association with the positional information and based on a signal intensity and the congestion level, an indicator indicating ease of communication between the mobile terminal device and the base station device at a position indicated by the positional information such that:
a higher signal intensity corresponds to a larger value of the indicator, and
a smaller congestion level corresponds to a larger value of the indicator; and
causes the indicator derived by the computer and the positional information to be transmitted to the mobile terminal device via the base station device;
wherein the indicator is used for displaying information related to the ease of communication in an image captured in the mobile terminal device such that the positional information is mapped to coordinates in the image.

* * * * *